(12) United States Patent
Schaffer et al.

(10) Patent No.: US 9,405,111 B2
(45) Date of Patent: Aug. 2, 2016

(54) SLIDER FOR SLIDING INTO THE OBSERVATION BEAM PATH OF A MICROSCOPE

(75) Inventors: Joerg Schaffer, Goettingen (DE); Peter Schnuell, Gleichen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 187 days.

(21) Appl. No.: 14/008,999

(22) PCT Filed: Feb. 27, 2012

(86) PCT No.: PCT/EP2012/053240
§ 371 (c)(1),
(2), (4) Date: Sep. 30, 2013

(87) PCT Pub. No.: WO2012/130542
PCT Pub. Date: Oct. 4, 2012

(65) Prior Publication Data
US 2014/0153088 A1 Jun. 5, 2014

(30) Foreign Application Priority Data
Apr. 1, 2011 (DE) .......................... 10 2011 006 667

(51) Int. Cl.
*G02B 21/00* (2006.01)
*G02B 7/00* (2006.01)
(Continued)

(52) U.S. Cl.
CPC ............ *G02B 21/0092* (2013.01); *G02B 7/006* (2013.01); *G02B 21/14* (2013.01); *G02B 21/34* (2013.01)

(58) Field of Classification Search
CPC .. G02B 21/14; G02B 21/0004; G02B 27/283; G02B 5/3083; G02B 21/0092; G02B 21/34; G02B 7/006; G02B 21/248; G02B 7/1805; G01B 9/04
USPC .................................. 359/371, 821, 381, 385
See application file for complete search history.

(56) References Cited

U.S. PATENT DOCUMENTS 4,255,014 A * 3/1981 Ellis ........................ G02B 21/14
359/371
6,674,574 B1 * 1/2004 Aono ................... G02B 21/025
250/201.3
(Continued)

FOREIGN PATENT DOCUMENTS

DE           103 21 091 B4     6/2005
DE       10 2004 048 300 A1    4/2006
(Continued)

*Primary Examiner* — Stephone B Allen
*Assistant Examiner* — Rahman Abdur
(74) *Attorney, Agent, or Firm* — Patterson Thuente Pedersen, P.A.

(57) ABSTRACT

The invention relates to an optical assembly that can be interposed into the observation beam path of a microscope, comprising a first mount. In the first mount, a stack of optical elements for a polarization optical, differential interference contrast method, is arranged to facilitate a first observation method. The stack comprises, inter alia, a polarizer, polarization-optical shearing elements, and an analyzer. The analyzer is arranged in the stack with regard to its polarization direction in a predetermined orientation relative to the polarization direction of the polarizer. The stack of optical elements in the first mount is arranged such as to be interchangeable. Further, the assembly comprises at least one additional mount for receiving optical elements for at least one additional observation method.

17 Claims, 2 Drawing Sheets

(51) Int. Cl.
*G02B 21/14* (2006.01)
*G02B 21/34* (2006.01)

(56) References Cited

U.S. PATENT DOCUMENTS 7,613,528 B2 * 11/2009 Shirota ............... G02B 21/365
 348/79
2004/0125373 A1 * 7/2004 Oldenbourg ....... G02B 21/0092
 356/364
2006/0103923 A1 * 5/2006 Dietrich ............... G02B 7/1805
 359/385

FOREIGN PATENT DOCUMENTS

| | | |
|---|---|---|
| DE | 10 2004 061 901 A1 | 5/2006 |
| DE | 10 2006 024109 A1 | 11/2007 |
| EP | 1 359 453 A2 | 11/2003 |
| JP | 2001 091835 A | 4/2001 |

* cited by examiner

SLIDER FOR SLIDING INTO THE OBSERVATION BEAM PATH OF A MICROSCOPE

PRIORITY CLAIM

This application is a National Phase entry of PCT Application No. PCT/EP2012/053240052472, filed Feb. 27, 2012, which claims priority from European Application No. 102011006667.5, filed Apr. 1, 2011, each of which are hereby incorporated by reference herein in their entirety.

FIELD OF THE INVENTION

The invention relates to a slider to be slid into the observation beam path of a microscope. Such a slider comprises a first socket, in which is arranged a stack of optical elements for a first observation method, that is a polarizing, differential interference contrast method. The stack of optical elements comprises a polarizer and polarizing shearing elements, e.g., in the form of a Wollaston or modified Wollaston prism composed of several single prisms, especially in the form of a Nomarski prism.

DESCRIPTION OF PRIOR ART

Objects to be observed through a microscope, especially biological objects, can be grouped essentially into two classes, i.e., into amplitude objects and phase objects. Under microscopic observation, amplitude objects change the light used for their illumination, in terms of its brightness (a.k.a. intensity), or also of its wavelength if, e.g., dyes are excited to emit light. In this way, amplitude objects can be made visible directly, whereas phase objects change only the phase position of the light, e.g., by variations in refractive index or thickness relative to the surrounding material, so that direct visualization is not possible, not even via electronic image sensors. Phase objects, though, may also be labeled with fluorescent markers and thus be made visible directly.

To make unlabeled phase objects visible, various microscopical methods have been developed, viz. phase contrast and interference contrast methods.

One of the most frequently employed interference contrast methods is known as differential interference contrast (DIC) according to Smith and Nomarski. In this method, two so-called Nomarski prisms—modifications of Wollaston prisms—are arranged in the beam path of a microscope: one each in the focal plane of the condenser on the illumination side and in the back focal plane of the objective on the imaging side. A polarizer for creating linearly polarized light is arranged in the beam path upstream of the first Nomarski prism. Having passed the second Nomarski prism, the light is analyzed by means of a second polarizer, a.k.a. the analyzer. Independent of the object, the illumination-side Nomarski prism splits the light up into two coherent partial waves, both of which are then influenced by the object. The second prism recombines the two partial beams, which can interfere with each other behind the analyzer. The polarization directions of polarizer and analyzer are normal to each other. The drawback of this arrangement is that the objective as well as all optical elements in the illumination beam path must be isotropic with regard to polarization, so that one cannot use birefringent plastic specimen slides nor objectives with noticeable stress birefringence.

An upgrade of this method, known as the PlasDIC method, is described, e.g., in EP 1 359 453 B1 and in an article by R. Danz et al. in the journal "Photonik", No. 1/2004, on pages 42-45. Herein, the PlasDIC method is described expressly with reference to these two documents. The PlasDIC method differs from the standard DIC method in that the linearly polarized light is produced only immediately in front of the image-side Nomarski prism and in that a slit diaphragm is used instead of a prism on the illumination side. For an optimum signal, the width of the slit must be chosen to make the effective pupil path difference in the direction of the slit width is smaller than or equal to a quarter wavelength or a quarter of the interference fringe spacing in the pupil.

This kind of specimen contrasting for imaging is frequently combined with other kinds of contrasting—e.g., with fluorescence contrasting. For changing, e.g., between the PlasDIC method and a fluorescence contrasting method, several steps have to be taken: first, the polarizer and the analyzer have to be removed from the beam path in order not to attenuate the fluorescence striking the detector. To avoid double images, the interferometrically active components, e.g., the Wollaston or Nomarski prism, also have to be removed from the beam path. Possibly, the objective may have to be changed. Depending on the fluorescent dyes, special excitation and emission filters have to be inserted into the beam path. And finally, the illumination method has to be changed from transmitted light as used in the PlasDIC method to fluorescent reflected light.

In motorized microscopes of the top price range, changing the components can be done in an automated fashion. Microscopes of the medium to low price ranges—one example being the Axiovert 40 made by Carl Zeiss MicroImaging GmbH—do without motorization, so that most changing operations have to be done manually, which takes time and is prone to error.

The essential components for the PlasDIC method are polarizer, shearing elements and analyzer. The analyzer is, as a rule, arranged on a filter turret or filter slider, which also contains the fluorescence emission filters; and as the observation method is changed, the analyzer and these filters change places in the active position in the observation beam path. The polarizer and shearing elements are cemented to each other, forming so-called PlasDIC prisms, which are available for use with a number of objectives. The range of objectives with which a PlasDIC prism can be used is limited, because (a) the pupil plane of the objective and the interference plane of the PlasDIC prism have to be made to lie in one and the same plane, which needs the prism design to allow for certain manufacturing parameters, and (b) the splitting caused by the shearing elements needs to fit in with the focal length of the objective used.

For that reason, the common PlasDIC prisms are arranged right behind the objective in the observation beam path. If a revolving nosepiece for several objectives is used, the nosepiece has a pocket allowing the prisms to be inserted into the nosepiece turret directly below the objective locating surface. The prisms then participate in the turret rotation, each together with its allocated objective. For this purpose, the PlasDIC prisms are, as a rule, arranged in special sliders, such as described, e.g., in the article by R. Danz et al. mentioned above.

In some cases, a PlasDIC prism may be used for several objectives. In this case the PlasDIC prism can be positioned in a plane outside the nosepiece turret, so that it does not participate in the movement of an objective change.

In motorized microscopes, the change between observation methods is carried out automatically. In microscopes that are at least partially motorized, the filter turret, the revolving nosepiece and/or the focusing drive are operated by motors and controlled automatically by suitable programs running on a PC connected to the microscope. However, even with a partially motorized microscope, the PlasDIC prism—same as the image-side Nomarski prism in case of the DIC method—must be removed manually. Especially with the PlasDIC method, the cemented polarizer will reduce the transmission; for a polymer-based one, the reduction will amount to about 25%. Unless this polarizer is removed, operators may attribute the diminished fluorescence intensity observed to a general shortcoming of the microscope.

DESCRIPTION OF THE INVENTION

Therefore, the problem of the invention is to improve a slider of the kind described above that is suitable for performing the PlasDIC method, as well as a suitable microscope, with the aim to reduce the number of steps needed to change between the various observation methods in manual or partially motorized microscopes. The invention further aims to reduce the components to be moved, as well as the possibility of operating errors by the user.

In a slider of the kind described above, this problem is solved in that the stack of optical elements in the first socket comprises an analyzer that is arranged in the stack in a permanently fixed orientation of its polarizing direction relative to the polarizing direction of the polarizer, with the stack of optical elements in the first socket being interchangeable and the slider comprising at least one more socket for receiving optical elements for at least one additional observation method.

Because the pair of polarizer and analyzer has a fixed relative position, the orientation of the shearing elements (e.g., of the Nomarski prism) relative to the polarizing directions and, thus, to the transmission directions of the two polarizing elements remains the same. On changing between two methods, then, the user need not carry out any aligning or adjusting operation, but only needs to insert into the beam path the condenser-side slit diaphragm that satisfies the $\lambda/4$ condition, and even this requires no action in case of, e.g., a change between fluorescent reflected-light illumination and PlasDIC transmitted-light illumination, since the illumination direction is reversed. The transmission directions of polarizer and analyzer may be set at any angle relative to each other, but preferably they cross each other at an angle of 90° and both have an angle of 45° relative to the splitting direction of the Nomarski prism. This orientation ensures maximum contrast.

The fixed orientation of the transmission directions and the splitting direction relative to each other makes it possible for the direction in which the slider is inserted into the microscope and, thus, the position of a corresponding slider pocket in the microscope, to be selected more flexibly and, in principle, arbitrarily, which provides more leeway for the design. By moving the slider in the sliding direction, contrast can be varied via influencing the path difference as the prism is decentered normal to the optical axis. In microscopes according to prior art, this is not possible because of the separation of the analyzer on the one hand and the polarizer and prism on the other.

In the first socket, the stack of optical elements is interchangeable; this makes it possible (a) to insert into the slider PlasDIC stacks for different objective groups, and (b) to insert PlasDIC stacks having suitable mounts into the slider at different angles.

Finally, to permit switching to another observation method, the slider comprises at least one more socket for receiving optical elements for at least one additional observation method. A second socket can receive, e.g., a filter for fluorescent emission; alternatively, the socket may remain empty to permit free light passage for bright-field illumination. The additional observation method may also be a conventional DIC method, e.g., according to Smith/Nomarski, or a PlasDIC method using different parameters, that is, e.g., different shearing elements, different polarizers/analyzers, or simply a different position of the transmission directions of polarizer and analyzer, or a different angle of inclination relative to the optical axis. The term "additional observation method" also subsumes variations of the PlasDIC method. Self-evidently, it is also possible to provide the slider with more than two sockets, as far as this is permitted by the design of the microscope to receive the slider. The third socket can then receive optical elements for a third observation method, e.g., a polarizer for transmitted-light illumination with polarization contrast.

By means of the invented slider it is easier for the operator to switch between two different contrasting methods, especially between a PlasDIC method and a fluorescence or other contrasting method not requiring polarization, because a single movement of the hand suffices to remove the shearing elements as well as both polarizing elements from the beam path. Thus, the operator cannot inadvertently fail to remove also the analyzer and/or the PlasDIC slider from the beam path, as it is removed simultaneously with the other elements. Also, the stack of optical elements can, without problems, be exchanged against another stack optimized, e.g., for a different group of objectives.

Preferably, the optical elements of the stack are cemented to each other. This makes it possible to easily replace the stack with another, and, in addition, makes sure that the optical effect and the transmission directions of analyzer and polarizer are permanent fixed, since the individual elements cannot be displaced against each other. On the other hand it is also possible to mount the optical elements individually or in groups and then to insert them with their mounts into a suitably designed slider. This permits, e.g., the shearing elements to be exchanged independently of polarizer and analyzer, or the use of other polarizers and analyzers with the same shearing elements.

The shearing elements may comprise, e.g., two wedge prisms cemented to each other and preferably forming a Nomarski or Wollaston prism. More than two prisms can be used as well.

Polarizer and analyzer preferably consist of a polyvinyl alcohol (PVA) sheet each. It is also possible to use polarizers and analyzers made of other materials, such as e.g., on the basis of glasses interspersed with metal particles, or so-called wire-grid polarizers. In case the polars, i.e. polarizer and analyzer, consist of PVA sheet, they are preferably cemented to a glass cover slip on the side facing away from the shearing elements, the cover slip protecting the polars against damage. If other materials are used, one can possibly do without a cover slip. It is also possible for the polars' sides facing the shearing elements to be cemented to the latter.

The first socket, in which the stack of optical elements is inserted, is preferably designed as a slide-in pocket for a slide-in unit. This slide-in unit serves as a mount holding the optical elements of the stack or, with the elements being cemented, the stack itself. The slide-in unit can then be inserted into the slide-in pocket, as a rule along the longitudinal axis of the slider, which is equal to the sliding direction of the slider in the microscope.

The stack of optical elements thus forms a compact slide-in unit to be inserted into the slide-in pocket The use of slide-in units makes it possible to implement, e.g., different tilts of the stack of optical elements, so that the contrasting direction can be varied. For turning the stack of optical elements and thus varying the contrasting direction, the stack of optical elements is simply inserted into another slide-in unit that implements a different tilt, or the slide-in unit is replaced with another one, in case the optical elements are permanently fixed to the slide-in unit, e.g., by adhesive bonding.

It is expedient for the slide-in unit to be provided with a knurled screw control for laterally displacing the stack of optical elements in the slide-in unit. This permits the path difference to be varied independently of the specimen. The slide-in unit itself may be fixed in the slider either force or form-closed, e.g., by means of magnetic holders or by screws.

The invention also relates to a microscope with a slider according to the invention as described hereinbefore. Such a microscope comprises, among other things, a revolving nosepiece with several objectives and a slider pocket, into which the slider is fitted so as ex-changeable and displaceable. The slider pocket is firmly arranged in the observation beam path between the revolving nosepiece and an eyepiece tube. So far, corresponding sliders with stacks of optical elements for the PlasDIC method had to be inserted into the revolving nosepiece itself, positioning of the slider pocket according to the invention is independent of the revolving nosepiece and also of a filter turret or filter slider, so that a stack of optical elements for the PlasDIC method can be used with for several objectives. Moreover, it is now possible, in principle, simultaneously with observation, to record both a fluorescence contrast and a PlasDIC image, because the respective filter position in the filter turret or filter slider is not blocked by the analyzer.

It is understood that the features mentioned before and those to be explained below are applicable not only in the combinations stated but also in other combinations or as stand-alone features without leaving the scope of the present invention.

BRIEF DESCRIPTION OF THE DRAWINGS

Below, the invention will be explained in more detail by way of example and with reference to the accompanying drawings, which also show features essential to the invention, among others, and in which.

DETAILED DESCRIPTION OF THE DRAWINGS

Figure 1A:
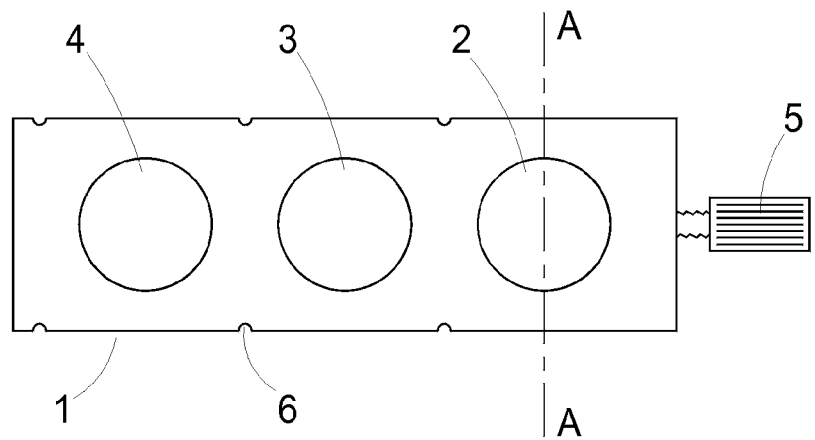
FIG. 1a is a top view of a slider.

FIG. 1 is a top view of a slider 1 to be slid into the observation beam path of a microscope. This slider comprises a first socket 2. Arranged in the first socket 2 is a stack of optical elements for a first observation method, viz. the PlasDIC method. The stack of optical elements in the first socket 2 comprises a polarizer, polarizing shearing elements and an analyzer. The analyzer is arranged in the stack in such a way that its polarizing direction has a permanently fixed orientation relative to the polarizing direction of the polarizer. Thus, the transmission directions of the two polars are fixed relative to each other.

The slider 1 comprises at least one more socket for receiving optical elements for at least one additional observation method. In the example shown in FIG. 1a, the slider 1 comprises two more sockets, viz. a second socket 3 and a third socket 4. In the second socket 3, e.g., optical elements for bright-field observation may be arranged. Another possibility is the arrangement of one or several filters in the second socket 3—for example, a fluorescence emission filter, which can be used in a fluorescence contrast observation method. There is no absolute need, though, for any optical element at all to be arranged in the second socket 3. It can be omitted if the second observation method intended is a simple transmitted-light observation. In the third socket 4, a polarizer can be arranged for transmitted-light observation with polarization contrast, or for a conventional differential interference contrast method according to Smith/Nomarski. The different observation methods mentioned above are to be understood as examples only; there is a great number of further observation methods, for which optical elements can be arranged in sockets 3 and 4. Evidently it is also possible to arrange another stack of optical elements for the PlasDIC method, comprising, e.g., polarizers/analyzers made of other materials, or other shearing elements.

Preferably, however, one would use socket 2 for the variations of the PlasDIC observation method, because this socket permits the easy change of optical elements. Preferably, therefore, the first socket 2 is designed as a slide-in pocket, whereas the stack of optical elements is combined into a slide-in unit 7 to be inserted into the slide-in pocket. Once inserted, the stack of optical elements can be laterally displaced in the slide-in unit 7 by means of a knurled screw 5. The lateral surfaces of the slider shown in FIG. 1b are provided with grooves 6, which engage with matching, resilient lugs in a slider pocket in the microscope and define click positions in which the apertures of the sockets 2, 3 and 4 are centered in the observation beam path of the microscope.

Figure 1B:
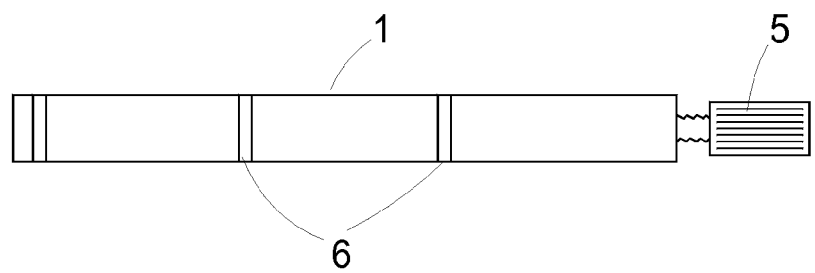
FIG. 1b is a side view of the slider.
Figure 2:
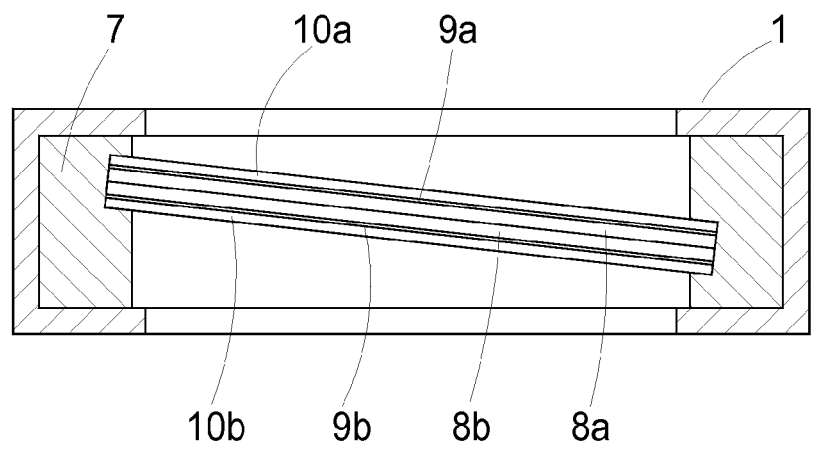
FIG. 2 is a section through a slider.

FIG. 2 is the cross-section of slider 1 along a line AA shown in FIG. 1a. Here, the optical elements are combined in a slide-in unit 7, in which they are arranged at a fixed angle relative to the optical axis of the observation beam path. The optical elements of the stack in FIG. 2 are arranged at an angle of slightly less than 10° relative to the optical axis, which is to be understood as an example only. The slide-in unit 7 can be replaced with other slide-in units that hold the optical elements at different angles.

The optical elements concerned are the shearing elements: here, two wedge prisms 8a and 8b, which are cemented to each other to form a Nomarski prism. The other (external) surfaces of the wedge prisms are cemented to polarizers. Wedge prism 8a has a polarizer 9a cemented to its external surface, and wedge prism 8b has an analyzer 9b cemented to its external surface. In the example shown, the slider, inserted in a microscope for inverted observation, is seen as a cross-section. Polarizer 9a and analyzer 9b may be made, e.g., of PVA sheets, although the use of other materials is possible as well. Preferably, the transmission directions of polarizer and analyzer cross each other at an angle of 90°. In this way, maximum contrast is ensured. Depending on the material they are made of, the polarizers (i.e., their sides facing away from the respective prism) may be cemented to glass cover slips 10a and 10b, as in the case shown here. Instead of all or some of the optical elements being cemented to each other, it is also possible to provide each element with a mount of its own and to insert them into a suitably designed slide-in unit. In this way, individual elements can be exchanged independently from the others, if required.

Figure 3:
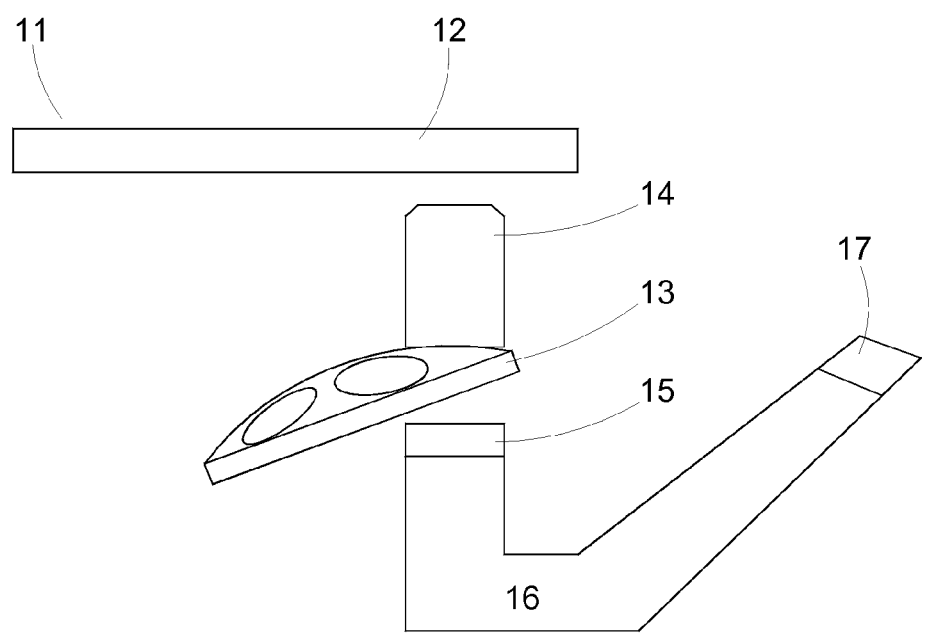
FIG. 3 is a sketch of an inverted microscope with a slider pocket.

FIG. 3 is a sketch of the setup of an inverted microscope 11 with which the slider 1 can be used. The inverted microscope 11 is provided with a specimen stage 12, above which there is a light source (not shown). Below the specimen stage 12, a revolving nosepiece 13 is arranged with objective 14 inserted into it, which has been turned into the observation beam path. Below the revolving nosepiece 13 there is a slider pocket 15, into which the slider 1 can be inserted and exchanged for others. Thus, the slider pocket 15 is arranged immovably in the observation beam path between the revolving nosepiece 13 and an eyepiece tube 16; at the end of the eyepiece tube 16 there is an eyepiece socket 17 for receiving eyepieces.

Thanks to the combination of the optical elements necessary for the PlasDIC observation method into a stack, in which all elements except the slit diaphragm are in a fixed arrangement relative to each other, a user is enabled to remove the entire stack from the beam path with a single movement of the hand, whereas at least two such movements are required in the prior art. It is also possible to provide a slider pocket that is not coupled to the revolving nosepiece, so that the stack can be used for several objectives. The stack can be exchanged for others, so that many objectives can be used with the same slider. In partially motorized and especially with manually operated microscopes, the number of steps required for changing from the PlasDIC method to another observation method is thus considerably reduced. Due to the smaller number of components, operation is less complex and less prone to error.

What is claimed is:

1. An optical assembly adapted to be selectively interposed into the observation beam path of a microscope, the optical assembly being configured as a slider, the slider comprising a first socket and a stack of optical elements to facilitate a polarizing, differential interference contrast method as a first observation method, the stack of optical elements being arranged in the first socket, the slider further comprising a second socket and a third socket, with optical elements for bright-field observation, or one or several filters being arranged in the second socket or the third socket, the stack of optical elements in the first socket comprising a polarizer, polarizing shearing elements, and an analyzer arranged in the stack in such a way that a polarizing direction of the analyzer has a permanently fixed orientation relative to a polarizing direction of the polarizer, the stack of optical elements in the first socket arranged so as to be selectively exchangeable, and wherein the slider comprises at least one more socket for receiving optical elements to facilitate at least one additional observation method.

2. The optical assembly of claim 1, wherein the optical elements of the stack are cemented to each other.

3. The optical assembly of claim 1, wherein the first socket is a slide-in pocket, and the stack of optical elements is combined into a slide-in unit to be inserted into the slide-in pocket.

4. The optical assembly of claim 3, wherein the slide-in unit is provided with a knurled screw for the lateral displacement of the stack of optical elements in the slide-in unit.

5. The optical assembly of claim 1, wherein the polarizing shearing elements comprise two wedge prisms.

6. The optical assembly of claim 1. wherein the polarizer and the analyzer comprise polyvinyl alcohol sheet material.

7. The optical assembly of claim 1, wherein at least one of the polarizer or the analyzer is cemented to the shearing elements, and wherein the stack of optical elements is cemented to a glass cover slip.

8. The optical assembly of claim 1, wherein in the third socket there is arranged a polarizer for transmitted-light observation with polarization contrast or tor a differential interference contrast method.

9. A microscope having an observation beam path, and an optical assembly selectively interposable into the observation beam path. the optical assembly comprising:
   a slider having a first socket and a stack of optical elements to facilitate a polarizing, differential interference contrast method as a first observation method, and wherein, as additional sockets, a second socket and a third socket are provided,and in the second socket or the third socket there are arranged optical elements for bright-field observation, or one or several filters, the stack of optical elements being arranged in the first socket, the stack of optical elements comprising:
   polarizer;
   polarizing shearing elements; and
   an analyzer, wherein the polarizer, polarizing shearing elements, and the analyzer are arranged in the stack in such a way that a polarizing direction of the analyzer has a permanently fixed orientation relative to a polarizing direction of the polarizer, the stack of optical elements in the first socket arranged so as to be selectively exchangeable, and wherein the assembly comprises at least one more socket for receiving optical elements to facilitate at least one additional observation method.

10. The microscope of claim 9, further comprising a revolving nosepiece and a pocket in which the optical assembly is selectively received, the pocket arranged in the observation beam path between the revolving nosepiece and an eyepiece tube.

11. The microscope of claim 9, wherein the optical elements of the stack of optical elements are cemented to each other.

12. The microscope of claim 9, wherein the first socket of the optical .assembly is a slide-in pocket, and the stack of optical elements is combined into a slide-in unit to be inserted into the slide-in pocket.

13. The microscope of claim 12, wherein the slide-in unit has a knurled screw for the lateral displacement of the stack of optical elements in the slide-in unit.

14. The microscope of claim 9, wherein the polarizing shearing elements comprise two wedge prisms.

15. The microscope of claim 9 wherein the polarizer and the analyzer comprise polyvinyl alcohol sheet material.

16. The microscope of claim 9, wherein at least one of the polarizer or the analyzer is cemented to the shearing elements, and wherein the stack of optical elements is cemented to a glass cover slip.

17. The microscope of claim 9, wherein in the third socket there is arranged a polarizer for transmitted-light observation with polarization contrast or for a differential interference contrast method.

* * * * *